G. E. MILLER.
RECESSING TOOL FOR LATHES.
APPLICATION FILED APR. 6, 1912.

1,035,221.

Patented Aug. 13, 1912.
2 SHEETS—SHEET 1.

WITNESSES

INVENTOR
George E. Miller
BY
ATTORNEYS

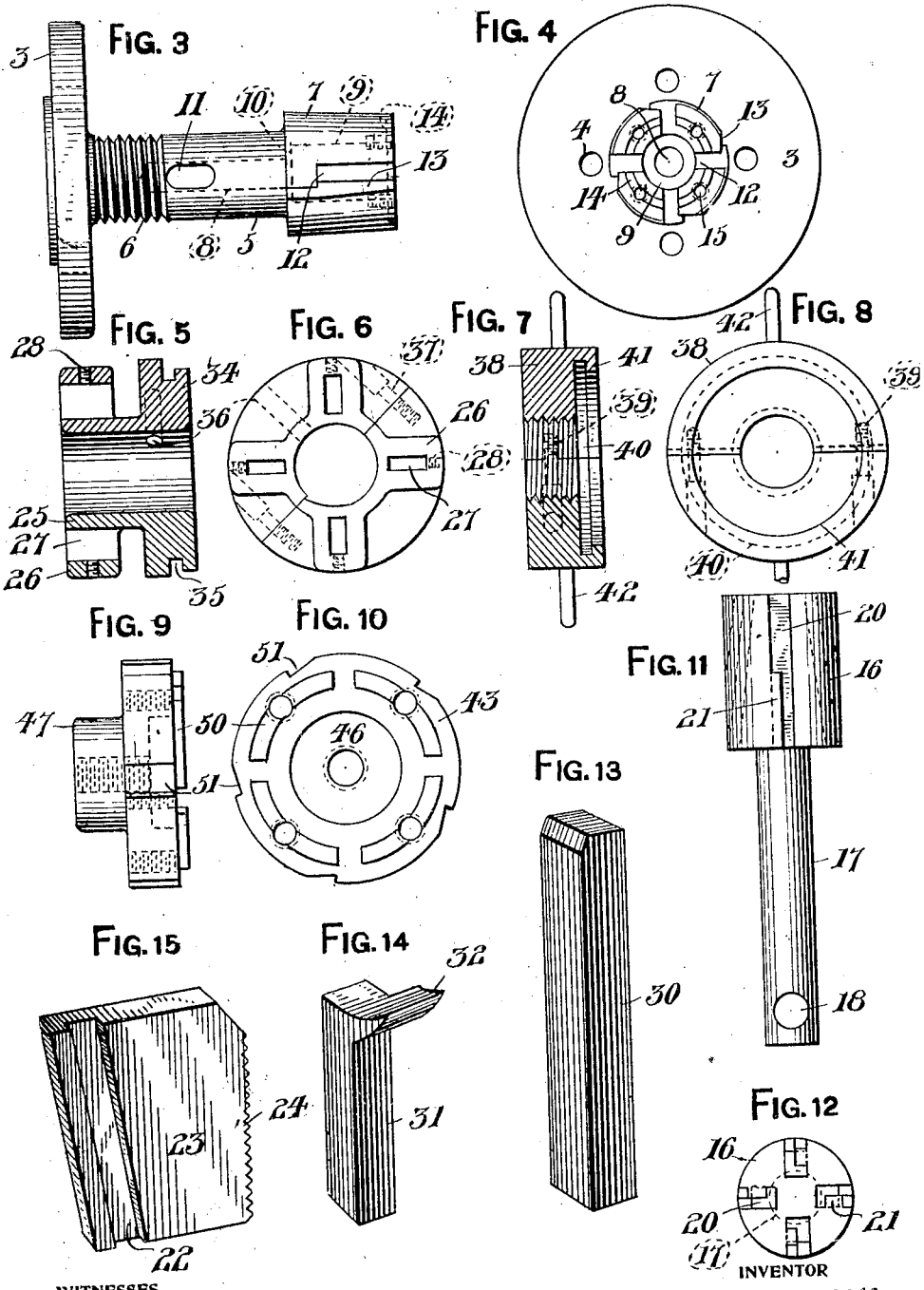

UNITED STATES PATENT OFFICE.

GEORGE E. MILLER, OF ETNA, PENNSYLVANIA.

RECESSING-TOOL FOR LATHES.

1,035,221.  Specification of Letters Patent.  Patented Aug. 13, 1912.

Application filed April 6, 1912. Serial No. 688,996.

*To all whom it may concern:*

Be it known that I, GEORGE E. MILLER, a citizen of the United States of America, residing at Etna, in the county of Allegheny and State of Pennsylvania, have invented certain new and useful Improvements in Recessing-Tools for Lathes, of which the following is a specification, reference being had therein to the accompanying drawing.

This invention is an improvement upon my Patent No. 605,184 granted June 7th, 1908 on an improved recessing-tool for lathes.

Besides having the same objects in view as disclosed in my prior patent, the present invention aims to provide a tapping device wherein positive and reliable means are employed, as hereinafter set forth, for quickly retracting the threading and recessing elements of my invention, whereby the device can be quickly removed from a piece of work.

My invention further aims to accomplish the above results by a mechanical construction that is durable, practical and highly efficient for the purposes for which it is intended.

The mechanical construction of my invention will be hereinafter specifically described and then claimed, and reference will now be had to the drawings, wherein there is illustrated a preferred embodiment of the invention, it is to be understood that the structural elements are susceptible to such variations and modifications as fall within the scope of the appended claims.

Figure 1:
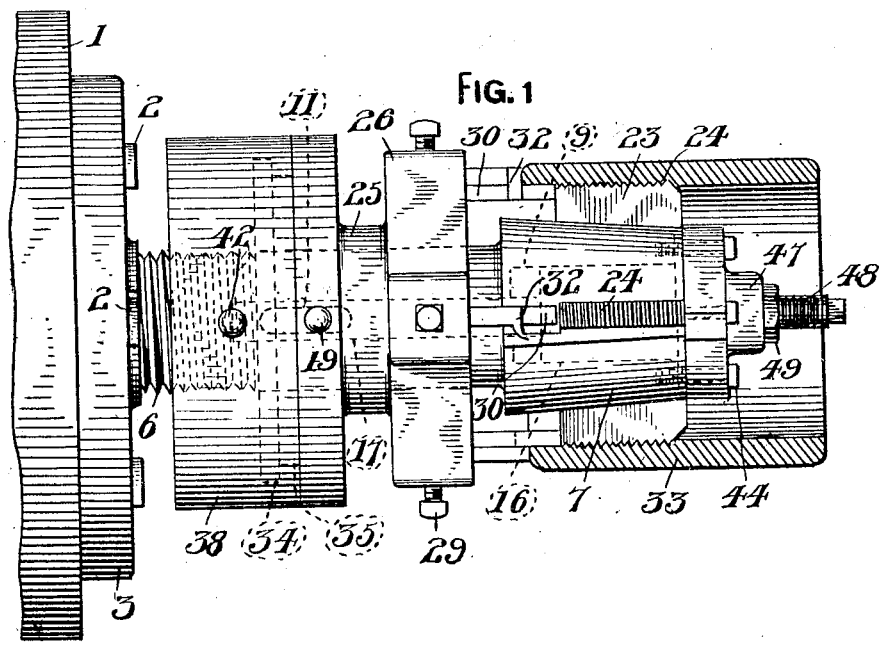
Figure 2:
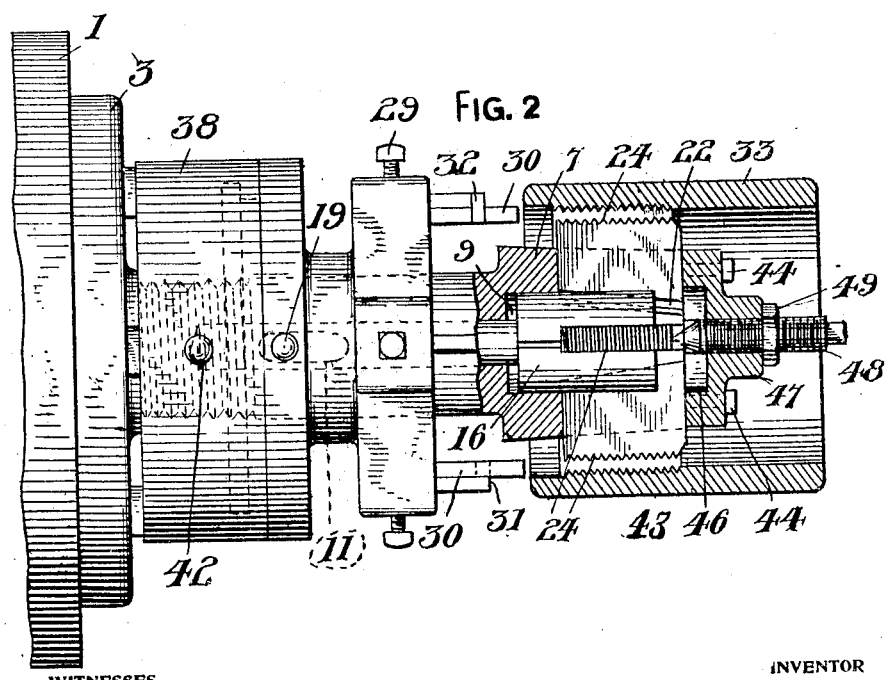

In the drawings:—Figure 1 is a side elevation of the tapping device showing the same in position operating upon a coupling, Fig. 2 is a similar view, partly broken away and partly in section, illustrating the device in a retracted position for immediate withdrawal from a piece of work, Fig. 3 is a side elevation of a lathe attachment, Fig. 4 is an end view of the same, Fig. 5 is a longitudinal sectional view of a detached reamer holder, Fig. 6 is an end view of the same, Fig. 7 is a cross sectional view of a sectional retracting device, Fig. 8 is an end view of the same, Fig. 9 is a side elevation of a regulating device, Fig. 10 is an end view of the same, Fig. 11 is an enlarged side elevation of an expander for a threading tool, Fig. 12 is an end view of the same, Figs. 13 and 14 are enlarged perspective views of reamer tools, and Fig. 15 is an enlarged perspective view of a threading tool.

Further describing my invention in detail, like numerals of reference designate corresponding parts throughout: 1 denoting a lathe head to which is secured, by screw bolts 2 or other fastening means, a lathe attachment, (see Figs. 3 and 4) comprising a circular plate 3 that has openings 4 to receive the screw bolts 2. The circular plate 3 has a stem 5, the inner end of which is screw threaded, as at 6. The outer end of the stem 5 has a frusto-conical shaped cutter holding head 7 and said head and the stem 5 have a longitudinal bore 8 extending from the outer end of the head into the threaded portion of the stem. The open end of the bore 8 is enlarged, as at 9 to provide an annular seat 10. The stem 5 has a transverse slot 11 that is in communication with the inner end of the bore 8.

12 denotes radially disposed slots in the walls of the head 7, said slots being in communication with the large end 9 of the bore 8. The slots 12 correspond in length to the head 7 and an outer edge of each slot is beveled, or cut away, as at 13 to provide clearance for shavings.

14 denotes segment shaped sockets in the outer end of the head 7 and said head has recesses 15 formed therein with the walls of said recesses screw threaded, for a purpose that will hereinafter appear.

16 denotes a cylindrical expander that is mounted in the large end 9 of the bore 8 upon the seat 10, said expander having a cylindrical shank 17 extending into the inner end of the bore 8. The shank 17 has a transverse opening 18 to receive a pin 19 that extends through the slots 11. The walls of the expander 16 have inclined grooves 20, the grooves being radially disposed and converging from the inner end of the expander to the outer end thereof, as best shown in Figs. 2, 11 and 12. A wall of each groove has a longitudinal tongue or rib 21 that extends into a groove 22 provided therefor in the side of a threading bit 23 that is mounted in the groove 20. The inner edge of each threading bit is angularly disposed relatively to the thread cutting edge 24 of the bit, said thread cutting edges being arranged in parallelism with the longitudinal axis of the expander 16 and the inner edges of the bits conform ing to the inclination of the grooves 20, the purpose of which will hereinafter appear.

25 denotes a reamer holder in the form of a sleeve that is placed upon the stem 5, between the threaded portion 6 thereof and the head 7. One end of the reamer holder 25 has radially disposed arms 26 provided with longitudinal openings 27 and radially disposed openings 28, the latter having the walls thereof screw threaded to receive set screws 29. Arranged in the opening 27 of each arm are reamer tools 30 and 31 that are retained therein by the set screw 29. The reamer tool 31 has a cutting tooth 32 that extends over the tool 30, as best shown in Figs. 1 and 2, the tooth 32 facing the end of a coupling 33 or other piece of work while the tool 30 reams the end of the coupling.

34 denotes a head carried by the opposite end of the reamer holder, said head having an annular groove 35 and a radially disposed opening 36 providing clearance for the pin 19. The reamer holder is made in two sections, as best shown in Fig. 6, whereby the holder can be fitted upon the stem 5, and the sections of said reamer holder are connected by screws 37.

38 denotes a sectional retracting device that is screwed upon the threaded portion 6 of the stem 5, the sections of said device being held together by screws 39. The inner end of the device has a recess 40 to receive the end of the head 34 and an annular rib 41 fitting in the annular groove 35 of the head 34. The retracting device has diametrically opposed handles 42 and when said device is adjusted upon the screw threads 6 by said handles, the reamer holder 25 is shifted longitudinally of the stem 5, also the threading tool holder 16 by reason of the pin 19 extending through the holder 25 and the stem 17. The longitudinal movement of the holders 25 and 16 relatively to the stem 5 is limited by the ends of the slot 11 in the stem 5.

43 denotes a regulating device in the form of a circular head that is secured to the outer end of the head 7 of the lathe attachment by set screws 44 extending through the openings 45 in the regulating device and into the recess 15 of the head 7. The regulating device 43 has the inner end thereof provided with a circular recess 46 to receive the outer end of the expander, and the outer end of the regulating device has a boss 47 for a screw 48 that is employed for controlling the outward movement of the expander. The screw 48 has a jam nut 49 for locking said screw in an adjusted position. The inner end of the regulating device has segment-shaped ribs 50 that fit into the sockets 14 of the head 7. The periphery of the regulating device is notched, as at 51 to provide clearance for shavings, particularly when the tapping device is being operated in a small coupling.

In operation, the coupling 33 or the piece of work is held and fed on to the tapping device, whereby the threading bits 23 will interiorly screw thread the coupling and ream or recess the end thereof, the threading and recessing of the coupling being simultaneously accomplished. Assuming that the operations have been performed, the reaming or threading tools or bits are quickly released relatively to the coupling by adjusting the retracting device 38 upon the stem 5. As the retracting device is revolved, the reamer holder 25 is shifted away from the coupling 33, as shown in Fig. 2, and simultaneously with the movement of the reamer holder the expander is shifted within the head 7 of the lathe attachment. As the bits 23 cannot shift longitudinally of the lathe attachment, the bits are retracted by reason of the inclined grooves 20 which allow the bits to recede from the walls of the piece of work, and the piece of work can be quickly removed from the tapping device. The tapping of a coupling or piece of work can therefore be economically and expeditiously performed, which is a desideratum in connection with small pieces of work.

It is thought that the operation and utility of the tapping device will be apparent without further description, and I would have it understood that other tools than those herein shown and described can be used for performing various kinds of lathe work.

What I claim is:—

1. A tapping device comprising a lathe attachment, an expander movable within said attachment, threading bits carried by said expander and shiftable relatively thereto, a reamer holder movable upon said lathe attachment and shiftable simultaneously with said expander, and a retracting device arranged upon said lathe attachment and connected to said expander and reamer holder for simultaneously shifting them.

2. A tapping device comprising a lathe attachment, an expander movable within said attachment, threading bits carried by said expander and shiftable relatively thereto, a reamer holder movable upon said lathe attachment and shiftable simultaneously with said expander, a retracting device arranged upon said lathe attachment and connected to said expander and reamer holder for simultaneously shifting them, and a regulating device connected to said lathe attachment to regulate the movement of said expander.

3. A tapping device comprising a lathe attachment, an expander shiftably arranged within said attachment, threading bits carried by said expander and extending radially from said lathe attachment, a reamer holder arranged upon said lathe attachment and movable simultaneously with said expander, reamer tools carried by said holder, a sectional retracting device adjustably mounted upon said lathe attachment and connected to said expander and reamer holder for simultaneously shifting them, and a regulating device connected to said lathe attachment and including a screw for limiting the movement of said expander and said reamer holder.

4. A tapping device comprising a lathe attachment having a slotted head, an expander movably arranged within said lathe attachment, threading bits movably mounted in said expander and shiftable relatively thereto, a sectional reamer holder arranged upon said lathe attachment and movable in unison with said expander, reamer tools carried by said reamer holder, a sectional retracting device adjustably mounted upon said lathe attachment and connected thereto and to the expander and holder for retracting said reamer tools and said bits relatively to a piece of work, and means carried by the head of said lathe attachment and including a screw for limiting the movement of said expander and holder.

In testimony whereof I affix my signature in the presence of two witnesses.

GEORGE E. MILLER.

Witnesses:
J. P. APPLEMAN,
CHRISTINA F. HOOD.

Copies of this patent may be obtained for five cents each, by addressing the "Commissioner of Patents, Washington, D. C."